W. C. McGILL.
Fare-Box.

No. 166,794.  Patented Aug. 17, 1875.

WITNESSES:

INVENTOR:
William C. McGill

UNITED STATES PATENT OFFICE.

WILLIAM C. McGILL, OF WASHINGTON, DISTRICT OF COLUMBIA.

IMPROVEMENT IN FARE-BOXES.

Specification forming part of Letters Patent No. 166,794, dated August 17, 1875; application filed June 12, 1875.

*To all whom it may concern:*

Be it known that I, WILLIAM C. MCGILL, of Washington, in the county of Washington and District of Columbia, have invented certain new and useful Improvements in Ticket-Registers; and I do hereby declare that the following is a full, clear, and exact description thereof, which will enable others skilled in the art to which it pertains to make and use the same, reference being had to the accompanying drawing and to the letters of reference marked thereon, which form a part of this specification.

My invention relates to improvements in fare-boxes. It consists in a revolving frame, the outer ends of the arms of which are provided with suitable notches, and which frame is so arranged with reference to the opening through which the tickets are passed, and to the registering devices of the box, that every ticket passed into the receiving-chamber will be recorded, and so that no ticket, when once put into the box, can be extracted or removed except as taken out by unlocking the box.

Figure 1:
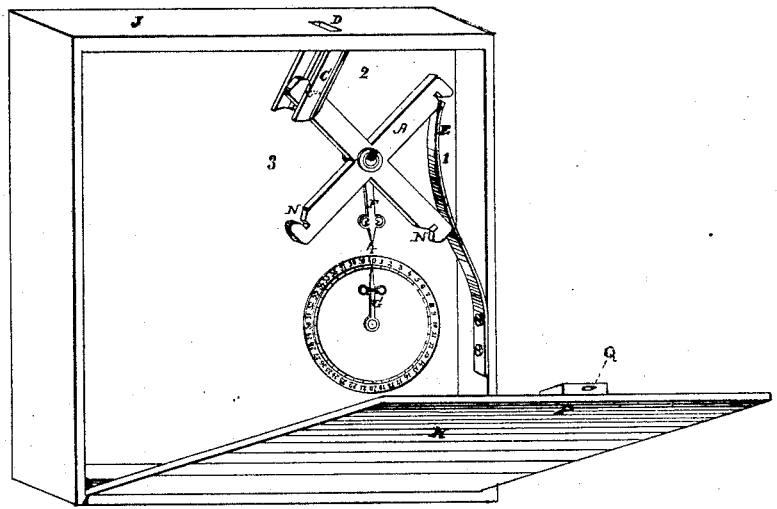
Figure 2:
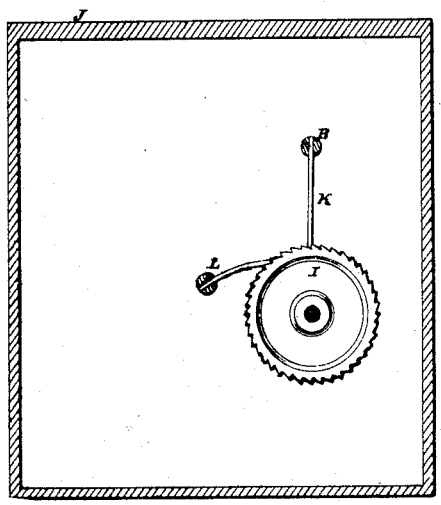
Figure 3:
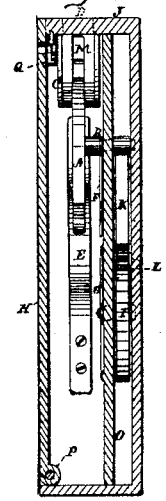

In the drawings, Figure 1 is a side view, and Fig. 3 is an end view, of a ticket-register with portions of the frame removed, so as to show my improvements attached; and Fig. 2 shows a portion of the registering devices.

B is a revolving frame, having the arms A, the outer ends of which are provided with the notches N, as shown. Instead of the arms crossed at right angles, as shown, any suitable form of frame may be used having projections with notches, so as to perform the same function as the arms in the drawings. The frame B is secured to, and is revolved by, a shaft, to which are attached the necessary arms or levers for operating the registering devices I G. It is so arranged that in its revolutions the outer ends of arms or projections A pass close to the top of the outer casing, and so as to bring the notch N a little past and under the opening D, through which the tickets are passed, and where it will be stopped and held in proper position to receive the end of the ticket by a spring, hereinafter described. C are two guides attached to the casing at the opening, and between which the arms A revolve. They are so placed as to guide the end of the ticket into the notch N in the end of the arm. E is a spring secured to the end plate of the casing; it bears against the ends of the arms A; it prevents the frame from turning backward by catching in the notch N; it acts on the frame so as to stop each arm in turn, with the notch N in proper position beneath the opening D. When a ticket is thrust into the box it will throw the following arm rapidly forward, so as to strike and knock said ticket down into the receiving-chamber. It is made of sufficient strength to hold the frame firmly in position, and yet permit the turning thereof by the pushing in of a ticket.

It will be seen that when a ticket is thrust into the box it will be guided to, and catch in, the notch in the end of the arm, and that the frame will be rotated, and said ticket will be pressed against the side of the opening D with sufficient firmness to prevent its dropping out should the hand be removed. When the outer end of the ticket comes flush with the top plate the spring will throw the frame around the next arm coming into position under the opening D, striking and knocking said ticket down into the chamber.

It will be seen that the end of the arm is close to the opening D, and that no ticket, after being put into the box, can be taken therefrom. The end of the arm or projection may be made of width equal to width of opening D, so as to more effectually close the latter.

It will be seen that by means of suitable attachments to the shaft on which the frame B revolves, the proper registry will be made of each ticket put into the box.

I do not confine myself to the use of any particular number of arms or projections A in the frame B.

Having described my invention, what I claim, and desire to secure by Letters Patent, is—

In combination with the revolving frame B, spring E, arranged to hold the frame in such manner as to prevent a backward movement and to force the frame around, so that one of its arms will strike the ticket and press it from the opening into the receptacle below after having been partly thrown around by the ticket being forced through opening D, substantially as herein represented and shown.

In testimony that I claim the foregoing as my own, I affix my signature in presence of two witnesses.

WILLIAM C. McGILL.

Witnesses:
A. P. LACEY,
GEORGE SIMS.